(12) United States Patent
Stevenson (10) Patent No.: US 9,134,549 B2
(45) Date of Patent: Sep. 15, 2015

(54) METHODS AND STRUCTURE FOR AFFIXING FRAMES ELEMENTS TO EYEGLASS LENSES

(71) Applicant: William Stevenson, Vista, CA (US)

(72) Inventor: William Stevenson, Vista, CA (US)

( * ) Notice: Subject to any disclaimer, the term of this patent is extended or adjusted under 35 U.S.C. 154(b) by 253 days.

(21) Appl. No.: 13/801,211

(22) Filed: Mar. 13, 2013

(65) Prior Publication Data

US 2014/0268004 A1    Sep. 18, 2014

(51) Int. Cl.
G02C 1/02       (2006.01)
G02C 9/04       (2006.01)
G02C 13/00      (2006.01)

(52) U.S. Cl.
CPC .. *G02C 9/04* (2013.01); *G02C 1/02* (2013.01); *G02C 13/001* (2013.01)

(58) Field of Classification Search
CPC ............ G02C 1/02; G02C 1/023; G02C 1/10; G02C 9/04; G02C 2200/10
USPC ............................... 351/57, 58, 110, 154, 178
See application file for complete search history.

(56) References Cited

U.S. PATENT DOCUMENTS

| 190,530 | A | 5/1877 | Yocco |
|---|---|---|---|
| 4,598,983 | A | 7/1986 | Tabacchi et al. |
| 5,940,164 | A | 8/1999 | Deppi |
| 6,264,326 | B1 | 7/2001 | Hyoi |
| 6,315,406 | B1 | 11/2001 | Carraro et al. |
| 6,315,407 | B2 | 11/2001 | Hyoi |
| 6,328,444 | B2 | 12/2001 | Hagiwara |
| 6,860,597 | B2 * | 3/2005 | Carlon ........................ 351/110 |
| 7,178,917 | B2 | 2/2007 | Xie |
| 2009/0109394 | A1 * | 4/2009 | Perie ............................ 351/110 |

* cited by examiner

*Primary Examiner* — Huy K Mai
(74) *Attorney, Agent, or Firm* — Marger Johnson

(57) ABSTRACT

Eyeglass frame elements may include a bridge and temples, and for an accessory attached to eyeglasses, one or more clips. Each of these elements includes an attachment point to the lens. For this attachment point a terminal portion of a metal wire is received through a first of two apertures formed through a lens adjacent an edge thereof. A remaining portion of the metal wire is received through a second of the two apertures. A first bend in the metal wire between the terminal portion and the remaining portion located is formed between the two apertures. This first bend is adjacent to a surface of the lens. A second bend in the metal wire is formed adjacent the second of the two apertures so that at least part of the terminal portion is adjacent an outside edge of the lens.

19 Claims, 5 Drawing Sheets

METHODS AND STRUCTURE FOR AFFIXING FRAMES ELEMENTS TO EYEGLASS LENSES

BACKGROUND OF THE INVENTION

This invention relates generally to eyeglasses and more particularly to methods for affixing lenses directly to frame elements such as bridges, temples, and/or clips.

Eyeglasses have historically been designed to include a full frame with eye wires or rims made of metal or plastic that surrounds and support corrective lenses made of glass or plastic. Because the frame and lens must be matched, the lens is cut to fit the frame rims and the frames assembled around the lens. Various other parts of the frame are attached to the rims such as the hinges and temples on both sides, and the bridge between them, that each complete the construction and help the glasses rest comfortably and securely on a wearers head.

The lenses of such eyeglasses are typically clear, although treatments are known that allow the lenses to change their transparency in reaction to light. In this way, a single pair of sunglasses could also be used as prescription sunglasses. More typically, however, a wearer would use an accessory that places a polarized and/or tinted lens in front of each of the eyeglass lenses to provide sun protection. Such accessories typically clip onto the front of the prescription lenses, but are typically framed which can cause a distraction to the wearer.

Given the number and complexity of the parts to the frame as well as the need for precise measurements and machining, constructing a completed set of eyeglasses is relatively complex, time-intensive, and expensive. Although frameless eyeglasses exist in which the size or the rims are minimized or eliminated altogether, the methods for securing the temples and the bridge to the lenses is somewhat complex and not always secure.

Accordingly, the need remains for an improved method for securing elements of the eyeglass frame directly to the lenses.

SUMMARY OF THE INVENTION

Eyeglass frame elements may include a bridge and temples, and for an accessory attached to eyeglasses, one or more clips. Each of these elements includes an attachment point to the lens. For this attachment point a terminal portion of a metal wire is received through a first of two apertures formed through a lens adjacent an edge thereof. A remaining portion of the metal wire is received through a second of the two apertures. A first bend in the metal wire between the terminal portion and the remaining portion located is formed between the two apertures. This first bend is adjacent to a surface of the lens. A second bend in the metal wire is formed adjacent the second of the two apertures so that at least part of the terminal portion is adjacent an outside edge of the lens.

The method for forming such an attachment point includes seating a bent wire having a first bend within two apertures formed through the lens adjacent an edge thereof so that a terminal portion of the bent wire is received through a first of the two apertures, a bent portion of the wire rests adjacent a backside of the lens, and a remainder of the wire is received through a second of the two apertures. Then, a second bend is created around the edge of the lens in the remainder of the wire adjacent the first bend and from a frontside of the lens to the backside of the lens so that an unbent rear portion of the wire extends parallel to the terminal portion of the bent wire received in the first of the two apertures.

When this process is used to construct an eyeglass accessory, the accessory, comprises a first lens and second lens. The first lens includes a first set of bridge holes formed adjacent an upper right inside edge of the first lens. The second lens includes a second set of bridge holes formed adjacent a left inside end of the second lens. The lenses are coupled together using a bridge wire having left and right terminal portions affixed within the first and second set of bridge holes. Each terminal portion of the bridge wire includes a first bridge wire bend adjacent a respective terminal end of the bridge wire such that the respective terminal end of the bridge wire is inserted within a first of the respective set of bridge holes and the remainder received through a second of the respective set of bridge holes. A second bridge wire bend is formed in the remainder of the bridge wire and folded around the inside edge of the respective lens. Finally, a third bridge wire bend is formed in the bridge wire resulting in the lenses being substantially parallel to one another.

Other elements of the accessory are possible, including first and second clip wires affixed within first and second sets of clip holes and/or first and second temple wires affixed within first and second sets of temple holes to form attachment points with the lenses per methods noted above. Such methods form a strong, stable, and low profile attachment of the metal wire to the lens while still allowing flexibility such that any accessory formed by such methods can be easily fitted over and secured to eyeglasses.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIGS. 12A and 12B are side elevations of the assemblies shown in FIG. 11A and FIG. 11B, respectively.

DETAILED DESCRIPTION

Figures 1, 2, 3:
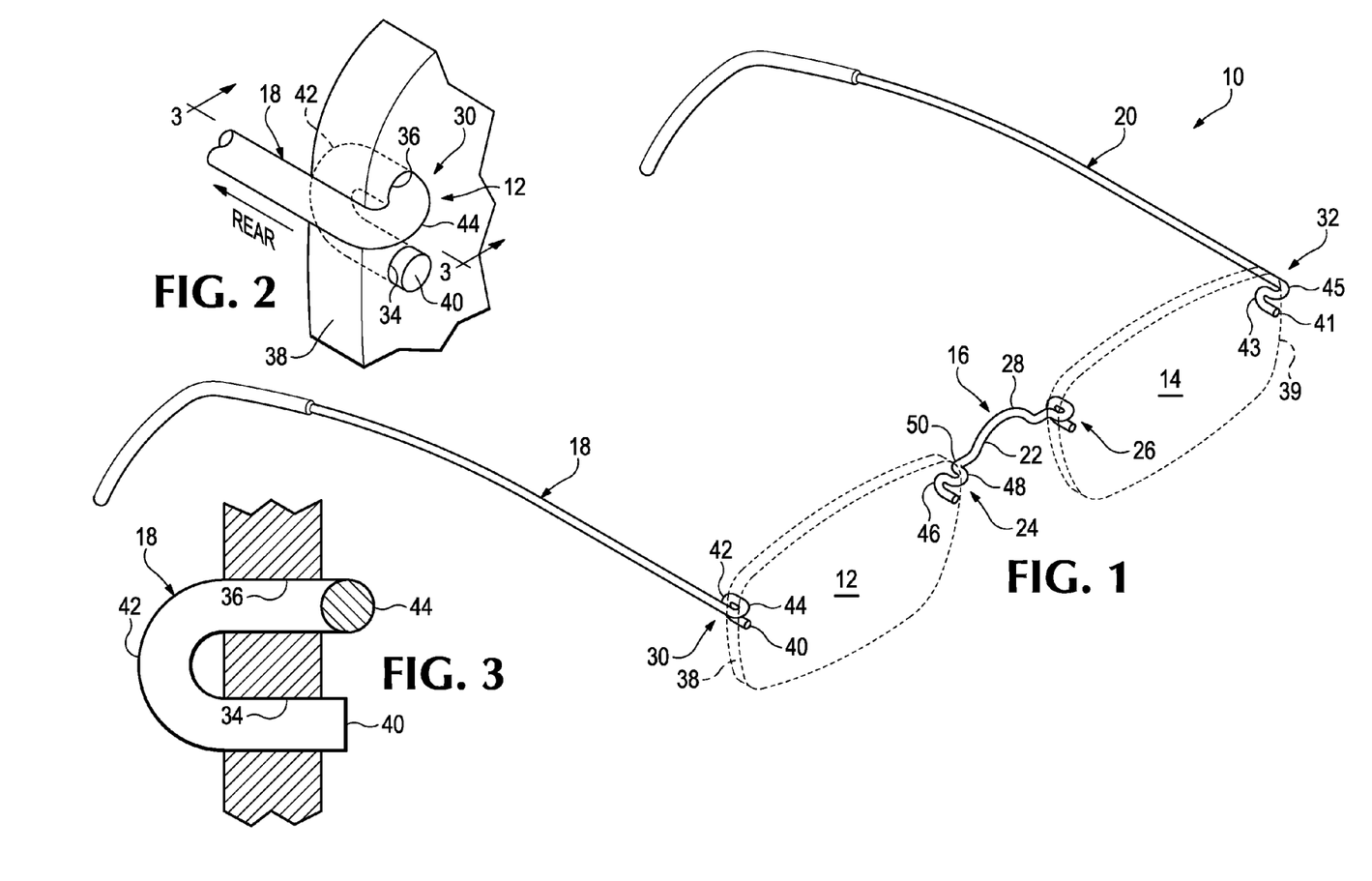
FIG. 1 is a perspective view of an eyeglass accessory using attachment points constructed according to a preferred embodiment of the invention.
FIG. 2 is a magnified perspective view from FIG. 1 showing an attachment point of the accessory frame to the lens implemented according to a preferred embodiment of the invention.
FIG. 3 is a section side view of the attachment point of FIG. 2.

FIG. 1 shows a first type of eyeglass accessory 10 using methods for attaching frame elements directly to right and left lenses 12, 14. The frame elements of accessory 10 include, generally, a bridge 16 and left and right temples 18, 20.

Bridge 16, coupling the left and right lenses 12, 14 together, is formed from a bridge wire 22 that is attached to right lens 12 using attachment point 24, and to left lens 14 using attachment point 26. Methods for attaching the bridge on each side of wire 22 to the lenses 12, 14 are shown in step-by-step fashion in FIG. 13. For the type of accessory shown in FIG. 1, forming wearable eyeglasses, the bridge wire 22 may be formed with an upward bend or ridge 28 to accommodate, fit over, and rest upon the nose bridge of the wearer of the accessory 10. For the type of accessory shown in FIG. 10 where the accessory attaches to a set of eyeglasses, the bridge wire 22 is bent downward to fit over and retain the corresponding bridge of the eyeglasses.

Right temple 18 is attached via attachment point 30 to right lens 12 adjacent a right outside edge 38 thereof, and left temple 16 is attached via attachment point 32 to left lens 14 adjacent a left outside edge 39 thereof. Positions are noted herein with respect to the wearer of the accessory and eyeglasses.

FIGS. 2 and 3 show attachment point 30, coupling the right temple wire 18 to right lens 12, in more detail as constructed according to a preferred embodiment of the invention. Attachment point 30 is structured similarly to the other attachment points 24, 26, and 32 of accessory 10 in that it includes a series of bends and insertions through corresponding apertures formed through the lens. Attachment point 30 utilizes a first set of temple holes 34, 36 formed adjacent a right outside edge 38 of the right lens 12. Right side temple wire 18 is affixed within the first set of temple holes 34, 36 such that a terminal portion 40 of the temple wire 18 includes a first bend 42 with the terminal portion inserted within a first 34 of the set of temple holes and the remainder received through a second 36 of the set of temple holes. A second bend 44 in the remainder is then folded around an edge 38 of the respective lens 12 so that the temple 18 extends to a rear of the eyeglass accessory 10.

Each of these attachment points, including insertions and first and second bends 42, 44, are preferably formed using steps illustrated in FIGS. 4 through 8.

The second temple wire 20 is similarly affixed to left lens 14 via a second set of temple holes adjacent a left outside edge of the second lens as shown in FIG. 1. Again, all directions are stated with respect to the wearer of the accessory, such that a right side of the accessory is adjacent the right eye of the wearer, the backside of the accessory is closest the users eyes, and the frontside of the accessory opposite the backside and facing the environment. As with right temple wire 18, the left temple wire 20 is affixed within a second set of temple holes such that a terminal portion 41 of the temple wire 20 includes a first bend 43 with the terminal portion inserted within a first of the set of temple holes and the remainder received through a second of the set of temple holes, and a second bend 45 in the remainder folded around an edge 39 of the respective lens so that the temple extends to a rear of the eyeglass accessory.

The bridge 22 is similarly attached on each side to respective right and left lenses 12, 14. The right lens 12 includes a first set of bridge holes formed adjacent an upper left inside edge of the first lens. The left lens 14 includes a second set of bridge holes formed adjacent a right inside edge of the second lens. The lenses are coupled together using bridge wire 22 having left and right terminal portions affixed within the first and second set of bridge holes. Each terminal portion of the bridge wire includes a first bridge wire bend (e.g. first bend 46) adjacent a respective terminal end of the bridge wire such that the respective terminal end of the bridge wire is inserted within a first of the respective set of bridge holes and the remainder received through a second of the respective set of bridge holes. A second bridge wire bend (e.g. second bend 48) is formed in the remainder of the bridge wire and folded around the inside edge of the respective lens. Finally, a third bridge wire bend (e.g. third bend 50) is formed in the bridge wire resulting in the lenses being substantially parallel to one another. Both right and left bridge attachment points 24, 26 are formed in similar fashion using similar bends and insertions.

The wires used to form the attachment points with the lenses is preferably formed of a rigid but resiliently malleable material such as a metal wire having a circular cross section. That is, the material should be capable of being bent into and retain its shape. More preferably, the wire is formed of a meta-stable beta titanium alloy such as that marketed under the brand Beta C and having relatively large (3-8.5% each) additions of molybdenum, aluminium, zirconium, chromium and vanadium, and smaller amounts (0.3-0.005% each) of iron, hydrogen, nitrogen, oxygen, yttrium, carbon, and other elements. The preferred wire material has a thickness or diameter of approximately 1 mm with the holes formed through the lenses having matching diameters to effect a tight fit with the wire while still allowing the wires to be slidingly received within the holes. The holes or apertures formed through the lenses 12, 14 are formed as by drilling using known computerized tools, robotics or special hand tools that are known in the art.

FIGS. 4-8 illustrate the steps for forming an attachment point of frame material, such as any of attachment points 24, 26, 30 or 32, with a respective lens 12, 14. For the purposes of explanation, construction of the attachment point 30 is described. However, the construction method is essentially the same for all attachment points used in the accessories shown in FIG. 1 and FIG. 10.

Figure 4:
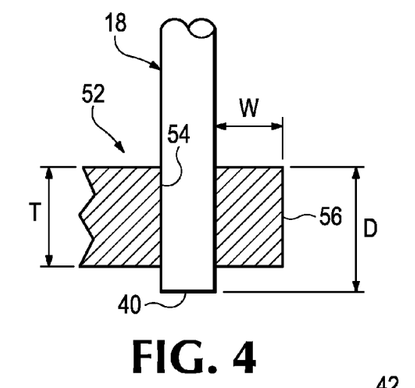
FIG. 4 is a section side view of a wire end of a frame inserted within a bending jig according to a first step in a preferred method for constructing the attachment point of FIG. 2.
Figure 5:
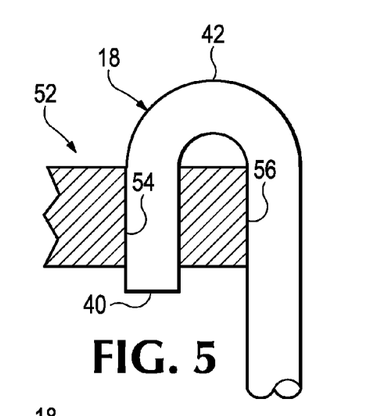
FIG. 5 is a section side view of a wire end bent around a bending jig according to a second step in a preferred method for constructing the attachment point of FIG. 2.

FIGS. 4 and 5 illustrate formation of a first bend 42 in the temple wire 18 using a jig 52. First, the wire is cut to an appropriate length. For a temple extending approximately 140 mm to the rear of the lenses, a temple wire 18 of an approximately length of 155 mm is cut to accommodate the approximate 15 mm it takes to form the attachment point 30. For a bridge piece 16 with attachment points 24, 26 at each end, a 20 mm bridge would require a bridge wire 22 be cut to have an approximate 50 mm length.

Jig 52 has a thickness T that approximates the thickness of lens 12 at a periphery thereof where the holes 34, 36 are formed therethrough. A typical thickness of a lens at a peripheral portion of lens 12 is approximately 2.2 mm, although the invention is in no way limited to this thickness. An example of a jig used for forming a first bend 42 in temple wire 18 is an American quarter or similarly sized metal slug. A hole or aperture 54 is formed through the jig 52 at a distance W from an edge 56 thereof, with distance W being approximately equal to a distance between the set of apertures 34, 36 formed through lens 12 adjacent an edge thereof. In a preferred embodiment, W is between approximately 2 mm and 3 mm in distance, and most preferably 2.5 mm. Wire 18 is inserted a distance D through hole 54 formed in jig 52, where D can equal jig thickness T, exceed T, or be less than the jig thickness. Preferably, however, a user would match D to be equivalent to the depth of apertures 34, 36 formed in lens 12. If this lens aperture depth is greater than the thickness T of the jig 52, then a user may insert the wire so that an end of terminal portion 40 extends out of the jig hole 54 by a desired distance (D−T).

Once the wire 18 has been properly inserted within hole 54 of jig 52, a first bend 42 is formed by folding the non-inserted portion of wire 18 around the outside edge 56 of jig 52. Provided hole 54 is drilled through jig 52 parallel to the outside edge 56, the bend is formed at a 180 degree angle. This angle should match the angle at which the apertures 34, 36 within lens 12 are formed with respect to one-another. Although it is preferred that apertures 34, 36 be parallel to one another, thus requiring a 180 degree first bend 42, other acute angles may be possible and this should be matched by the angular orientation of jig hole 54 to jig edge 56.

Figure 6:
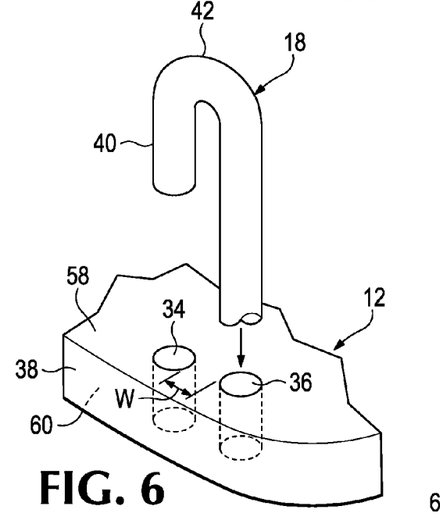
FIG. 6 is a perspective view illustrating insertion of the bent wire end within the lens according to a third step for constructing an attachment point according to a preferred embodiment of the invention.
Figure 7:
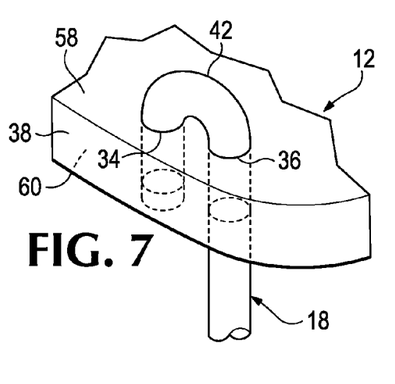
FIG. 7 is a perspective view illustrating seating of the bent wire end within the lens according to a fourth step for constructing an attachment point according to a preferred embodiment of the invention.

FIGS. 6 and 7 illustrate insertion and seating of the terminal portion 40 of the previously bent temple wire 18 into a first 34 of the set of apertures 34, 36 with the remainder received through the second 36 such aperture. Because the remainder of temple wire 18 is much longer than the terminal portion 40, the remainder is inserted first through aperture 36 and then drawn through the hole until the terminal portion 40 is also received through aperture 34 as shown in FIG. 7. When properly seated, the first bend 42 of temple wire 18 rests adjacent a backside 58 of lens 12, with lens 12 (like lens 14) having a preferably curved backside 58 and frontside 60 to affect proper focus (if prescription), fitting, or fashion. To assist with this insertion and seating process, the inserted wire 18 is exposed to a hybrid-thermal induction process that heats up the wire and assists with its insertion and conformation within respective apertures 34, 36.

Figure 8:
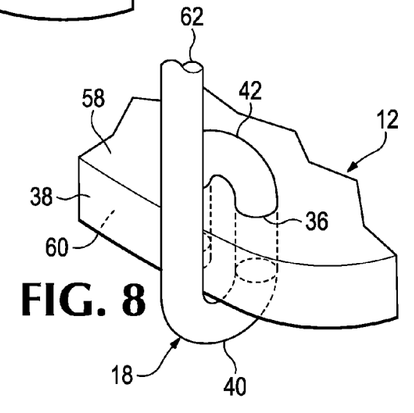
FIG. 8 is a perspective view illustrating a fourth step for constructing an attachment point according to a preferred embodiment of the invention wherein a secondary bend is formed around an outside of the lens.

FIG. 8 illustrates the process for creating a second bend 44 in temple wire 18. With the bent wire having first bend 42 firmly seated within apertures 34, 36 (each preferably spaced the same distance from edge 38 of lens 12 and thus formed in a line parallel to an outside edge 38), a second bend 44 is formed around the outside edge 38 of lens 12 in the remainder of the wire adjacent the first bend from a frontside 60 of the lens 12 to the backside 58 of the lens. Second bend 44 is preferably formed perpendicular to first bend 42, e.g. where first bend 42 is parallel to the edge 38 of lens 12 but second bend 44 is perpendicular to said lens edge 38. In the final form of attachment point 30, the unbent rear portion 62 of the temple wire 18 extends parallel to the terminal portion 40 of the bent wire received in the first 34 of the two apertures 34, 36.

Each lens 12, 14 may include a first attachment point—e.g. temple attachment points 30, 32, respectively—and a second attachment point—e.g. bridge attachment points 24, 26, respectively—with each including a second bent wire in a different area of the lens and adjacent a different edge of the lens from the first attachment point. The lenses can then be coupled together using these second bent wires (e.g. common bridge wire 22) and attachment points 24, 26.

Figure 9:
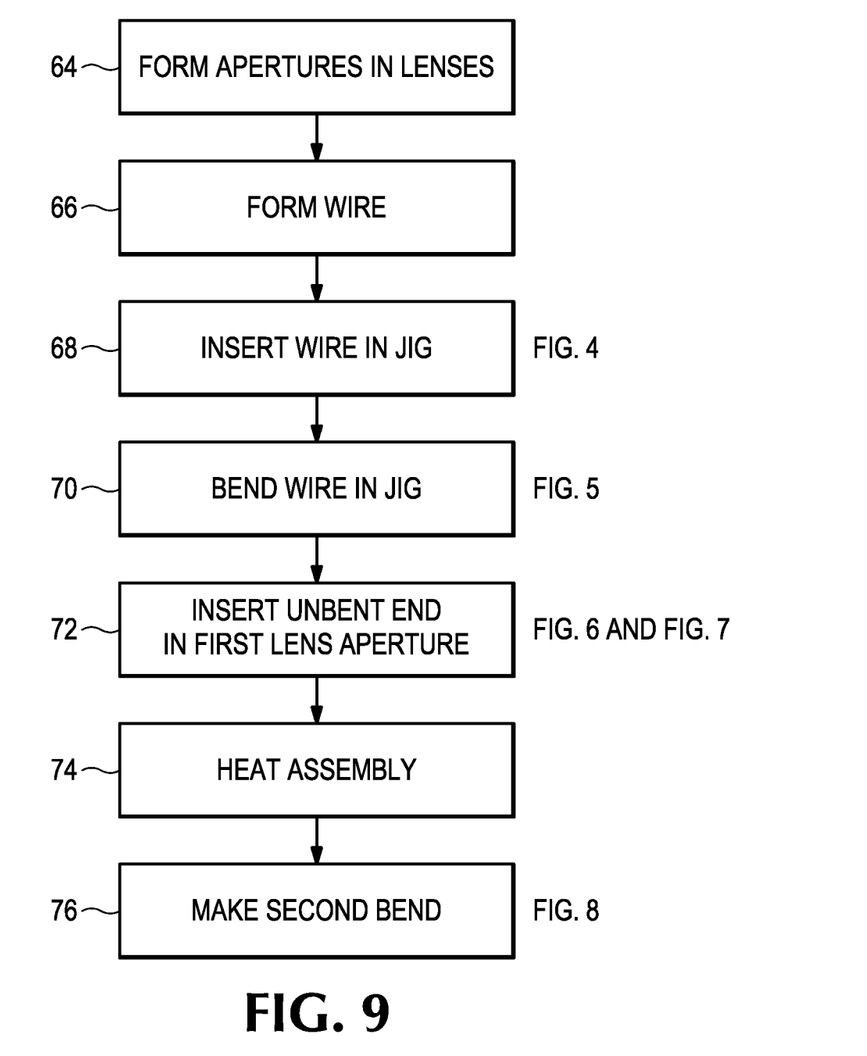
FIG. 9 is a flow chart illustrating the preferred method for affixing the accessory frame to the accessory lenses according to an implementation of the invention.

FIG. 9 is a flow diagram illustrating the process steps for forming attachment points coupling the frame elements to a respective lens. Block 64 comprises forming apertures in lenses so that they are configured to accepted the frame elements, e.g. by forming a first adjacent set of apertures though an outer [e.g. for temple] expanse of a lens and a second adjacent set of apertures through an inner [e.g. for bridge] of the lens; the apertures having an approximate dimension matching the wire cross-section used in the following steps. For attachment point 30, apertures 34, 36 are formed an approximate distance 2 mm to 3 mm (and more preferably 2-2.5 mm) from the edge 38 of lens 12 and distance W=2.5 mm from each other. The distance at which the apertures 34, 36 are spaced from the edge 38 of lens 12, as well as the distance W between the apertures, are greatly influenced by the thickness of the lens and strength of the material at that locations. A thick lens will be more apt to hold an attachment point without breaking even if spaced close to the edge of the lens or with apertures close together, whereas a thin lens may require greater spacing. The invention is not limited to a particular type of spacing, although it is understood that minimizing the spacing will also minimize the profile of the attachment and the distraction it may pose to the wearer of the eyeglass accessory wearer. The preferred method for forming such apertures includes drilling using known computerized tools, robotics or special hand tools that are known in the art and have a cross-sectional dimension adapted to accept the frame element through. With the preferred Beta C titanium alloy wire used to form the attachment point 30, the apertures 34, 36 are formed to have a circular cross-sectional diameter of approximately 1 mm, although the invention is not intended to be limited to any particular dimension.

A wire or frame element—e.g. temple wire 18—is formed to the approximate length in block 66. As explained above, accommodation must be made when sizing the wire to take in to account the amount necessary to form the attachment point bends and insertions. That is, one would cut an appropriate length of wire [e.g. special titanium 'Beta C'] where approximately 15 mm extra is dedicated to the attachment to the lens, so that if the temple needs to be 140 mm, then you need a 155 mm length of wire and for a bridge with two attachments, you need an extra 30 mm, so 50 mm for a 20 mm bridge. In block 68, and as shown in FIG. 4, the frame element (e.g. temple wire 18) is inserted within jig 52 so that a terminal portion 40 of wire 18 extends a desired distance D through jig hole 54. The first end of wire is inserted through an aperture in jig so that a desired length of this first end is exposed where the desired length is typically the thickness of the lens [e.g. 2.2 mm]. In block 70, a first bend 42 is then made in the wire 18 as shown in FIG. 5, preferably to form a first 180 degree bend. The second [e.g. unbent] end of wire is then inserted through one of the apertures in the lens and pulled through until the first [e.g. bent] end of the wire is received through and seats within the adjacent hole; if done correctly, then the first end of the wire extends substantially through the depth of the hole. The bent wire portion is inserted within the lens apertures in block 72 so that it is seated therein as shown in FIGS. 6 and 7. The seated and inserted wire portions are then heated in block 74, as by using the hybrid-thermal induction process discussed above so that metal conforms better to the holes. Finally, a second (preferably 180 degree) bend 44 is then made in the frame element in block 76 around the outside of the lens and as shown in FIG. 8 with the second bend preferably being perpendicular to the first bend 42.

Figure 10:
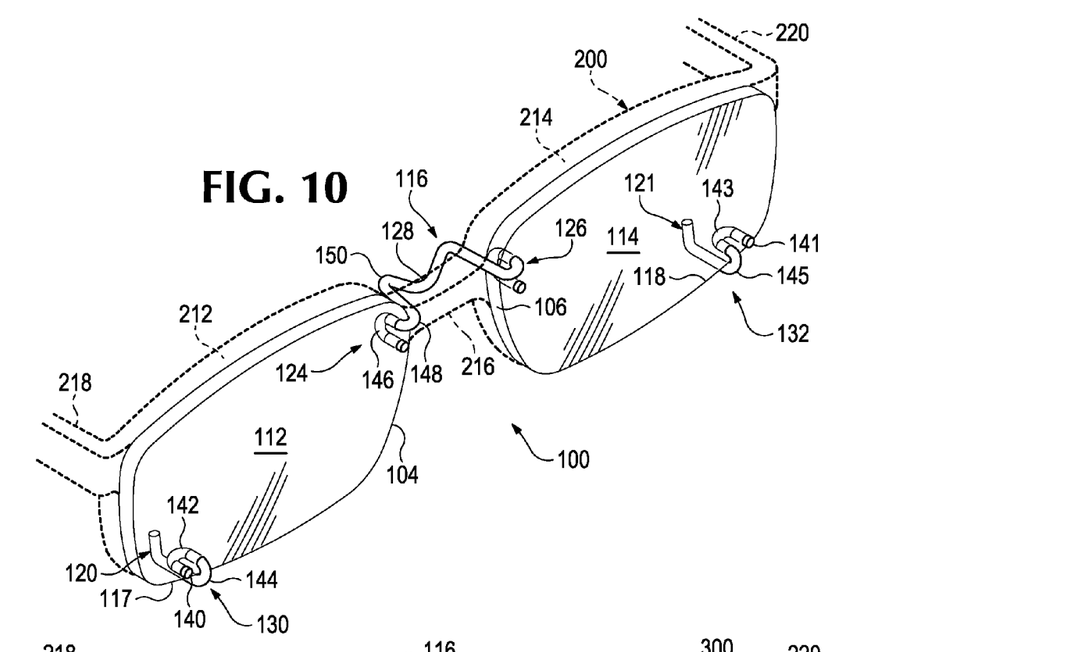
FIG. 10 is a perspective view of a clip-on accessory formed using attachment points constructed according to a preferred embodiment of the invention installed on eyeglasses shown in dashed lines.

FIG. 10 illustrates a second eyeglass accessory 100 of a clip-on variety configured to attach onto the outside of prescription eyeglasses 200 (shown in dashed lines). Eyeglass accessory 100 includes a first lens 112 having a first set of bridge holes—similarly situated to those formed in the bridge 16 of accessory 10—formed adjacent an upper left inside edge 104 of the first lens 112 and a second lens 114 having a second set of bridge holes adjacent a right inside edge 106 of the second lens 114.

Clip-on accessory 100 includes a bridge wire 116 having left and right terminal portions 108, 110 (FIG. 13) affixed within the first and second set of bridge holes. Each terminal portion of the bridge wire is affixed to respective lenses 112, 114 via respective attachment points 124, 126 that are formed with bends and insertions as described above in accessory 10. That is, each terminal portion includes a first bridge wire bend of preferably 180 degrees, e.g. bend 146, adjacent a respective terminal end 108 of the bridge wire 116 such that the respective terminal end is inserted within a first of the respective set of bridge holes. A remainder of the wire is received through a second of the respective set of bridge holes. A second bridge wire bend 148 in the remainder is folded around the inside edge—e.g. edge 104—of the respective lens 112. The second bend 148 is preferably a full 180 degree bend and formed perpendicular to the first bend 146. Finally, a third bridge wire bend 150 is formed at approximately a 90 degree angle so that the lenses 112, 114 are formed substantially parallel to one another.

Figure 13:
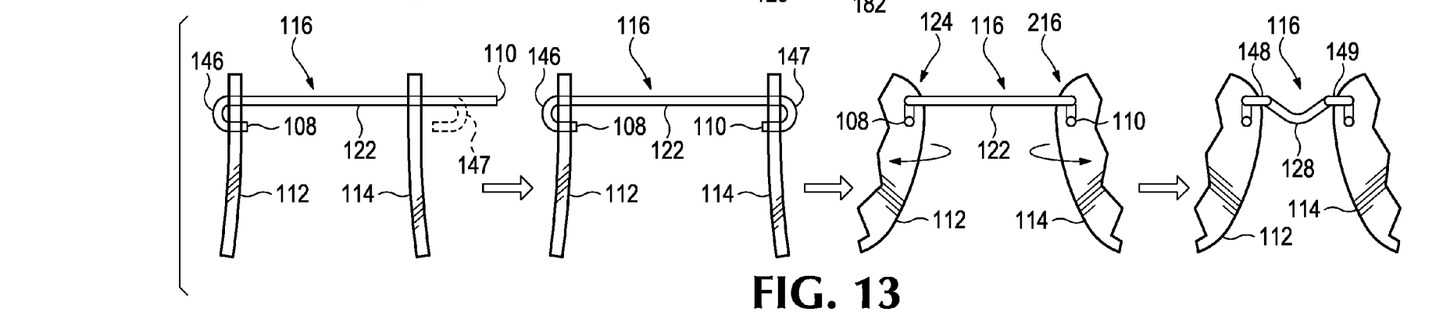
FIG. 13 is an elevation view showing the multi-step process for forming an eyeglass or accessory bridge according to an implementation of the invention.

FIG. 13 visually represents the steps needed to form bridge 116 (and also bridge 16). A first bend 146 is made in one end of bridge wire 122, as by using the jig shown in FIGS. 4 and 5. The distance between the bent wire portion in terminal end 108 matches the distance between the bridge holes formed adjacent the upper left edge of lens 112 so that the wire 122 and terminal end 108 may be drawn through and seated within the bridge holes of lens 112. The opposing terminal end 110 of bridge wire 122 is inserted through a second (e.g. upper) of the set of bridge holes of lens 114 from a front side of lens 114 to a backside so that a substantially portion of the terminal end 110 sticks out. A first bend 147 in terminal end 110 is then made using the jig front FIGS. 4 and 5, and the lens 114 pulled outward so that the bend seats within the bridge holes of lens 114. When so inserted, the frontsides of each lens 112, 114 face one-another. A second (preferably 180 degree) bend (e.g. bends 148, 149) is then made in each attachment point 124, 126 by folding the lenses 112, 114 away from each other so that the bridge wire 122 folds over respective inside edges of lenses 112, 114. Third bends (each preferably 90 degree) are made a determined inward distance from each second bend so that the lenses are in proper alignment with one another, and a downward clip bend 128 made in the center of bridge wire 122 so clip onto the bridge of eyeglasses 200 as described below.

Turning back to FIG. 10, accessory 100 includes clips on lower edges of the accessory to assist with attaching the accessory 100 to the eyeglasses 200. A first set of clip holes are formed adjacent a lower right outside edge 117 of the first lens 112 and a second set of clip holes are formed adjacent a lower left outside edge 118 of the second lens 114. First and second clip wires 120, 121 are affixed with the first and second set of clip holes, respectively. Each clip wire includes a first clip wire bend, e.g. bend 142 or 143, adjacent a respective terminal end 140, 141 of the clip wire 120, 121. The respective terminal ends 140, 141 of clip wires 120, 121 are inserted within a first of the respective set of clip holes and the remainder received through a second of the respective set of clip holes. A second wire bend, e.g. bend 144, 145, in the remainder is folded around the respective lower edge 117, 118 of lens 112, 114 so that a terminal end of the remainder is configured to retain the lower edges of eyeglasses 200 on which the accessory is installed. Preferably, these terminal ends form an upward bend as shown in FIG. 10 that is spaced a certain distance from the backsides of the accessory lenses 112, 114, with the spacing just a little larger than the thickness of the eyeglass lower edge being retained.

Figure 11A:
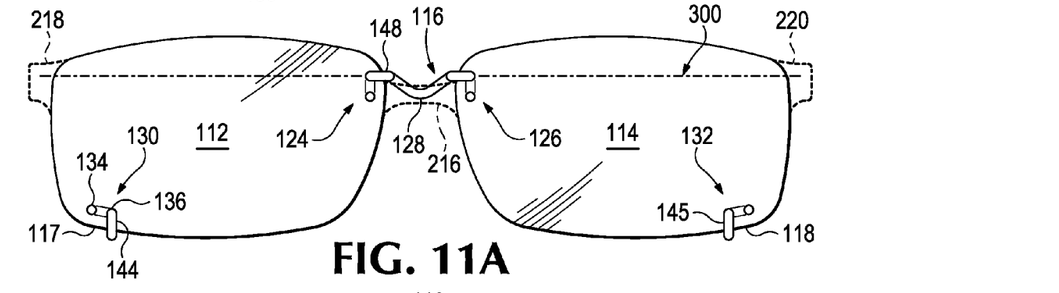
FIGS. 11A and 11B show front elevations of the clip-on accessory of FIG. 10 in assembled and partially removed positions, respectively.
Figure 12A:
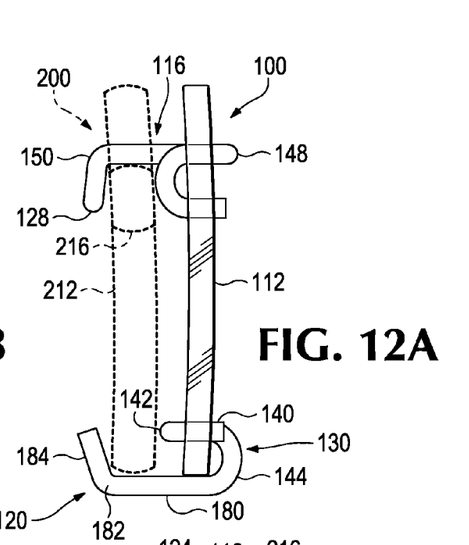

FIGS. 11A and 12A illustrate the eyeglass accessory 100 in a coupled position over eyeglasses 200. In such a position, lenses 112, 114 align with respective lenses 212, 214 on the eyeglasses. Eyeglasses further include an eyeglass bridge 216 and eyeglass temples 218, 220. In the assembled position, the accessory 100 is level as shown by the line 300 connecting the accessory bridge 116 with an outside edge of the accessory adjacent eyeglass temples 218, 220. The accessory is retained onto the eyeglasses 200 at three locations: (1) the downward bend 128 rests over the eyeglass bridge 216, and (2) and (3) the eyeglass lenses (or frame) is retained within the hook formed on the terminal end of each clip wire—e.g. at terminal end 120. In a preferred embodiment, the terminal end 120 includes a flat portion 180 extending to the rear of the accessory 100 with a length that is a bit wider than the thickness of eyeglasses 200 to accommodate the first bend 142 of attachment point 130. Terminal end 120 includes an upward bend 182 and ending in an upward retainer 184 that rests against the backside of the eyeglass lens 212.

Figure 11B:
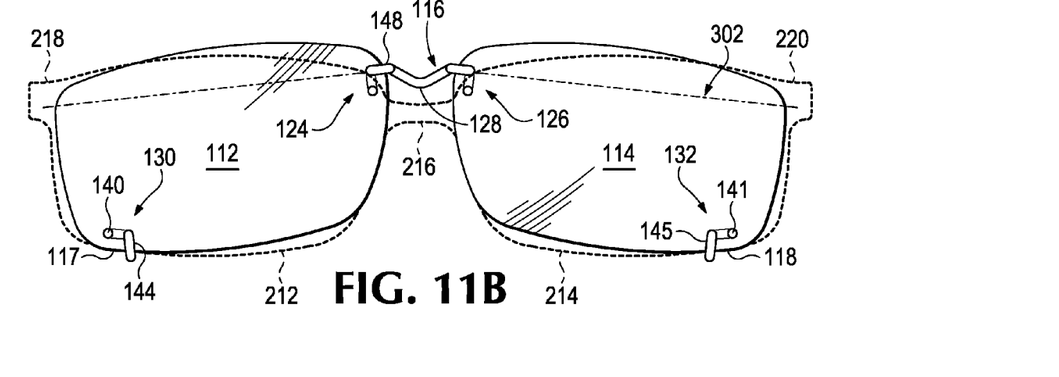
Figure 12B:
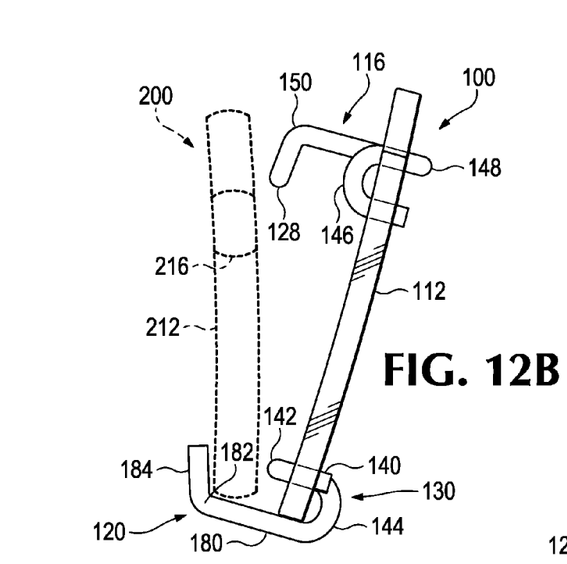

FIGS. 11B and 12B illustrate how the eyeglass accessory 100 may be installed and removed from the eyeglasses 200. By lifting up on the downward bend 128 formed in accessory bridge 116, each lens 112, 114 rotates with respect to one another so that the accessory is no longer level as noted by line 302. That is, the clip attachment points 130, 132 still retain the bottom of the eyeglasses 200 by slide slightly inward along the bottom edge of the eyeglasses as the accessory bridge 116 is lifted. This is made possible due to the configuration of attachment points 130, 132 being formed with apertures and resilient framing material that allow rotation about the second of the sets of bridge holes.

With accessory bridge 116 lifted up and over eyeglass bridge 216, the hook end 128 clears bridge 216 and may be removed. During installation, the resilient nature of the wire used with the accessory bridge 116 allows bridge 116 to snap over and retain eyeglass bridge 216.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for forming an attachment point of a metal wire to a lens of a type having two apertures formed through the lens adjacent an edge thereof, the method comprising:
    seating a bent wire having a first bend within two apertures formed through the lens adjacent an edge thereof so that a terminal portion of the bent wire is received through a first of the two apertures, a bent portion of the wire rests adjacent a backside of the lens, and a remainder of the wire is received through a second of the two apertures;
    creating a second bend around the edge of the lens in the remainder of the wire adjacent the first bend and from a frontside of the lens to the backside of the lens so that an unbent rear portion of the wire extends parallel to the terminal portion of the bent wire received in the first of the two apertures.

2. The method of claim 1, wherein the first bend and second bend are each 180 degree bends.

3. The method of claim 2, wherein the second bend is perpendicular to the first bend.

4. The method of claim 1, further including the step of exposing the bent wire to hybrid-thermal induction during the seating step.

5. The method of claim 1, wherein the step of seating the bent wire includes:
forming the first bend prior to seating so that a terminal portion of the bent wire is approximately equal in thickness to a thickness of the lens; and
inserting the remainder of the wire from the backside of the lens through the second aperture and drawing it through the second aperture until the terminal portion is received within the first aperture.

6. The method of claim 1, further including:
forming a second attachment point on the lens using a second bent wire in a different area of the lens and adjacent an edge of the lens; and
coupling a second lens to the first lens via the second bent wire.

7. The method of claim 1, further including the step of pre-forming the first bend by inserting the terminal portion of the metal wire in a jig having a jig aperture formed adjacent a peripheral edge of the jig and bending a non-inserted portion around the peripheral edge, wherein the jig has a thickness substantially similar to a thickness of the lens.

8. An attachment point configured to couple a lens to metal wire, comprising:
a terminal portion of a metal wire received through a first of two apertures formed through a lens adjacent an edge thereof;
a remaining portion of the metal wire received through a second of the two apertures;
a first bend in the metal wire between the terminal portion and the remaining portion located between the two apertures, said first bend being adjacent to a surface of the lens; and
a second bend in the metal wire adjacent the second of the two apertures so that at least part of the remaining portion is adjacent an outside edge of the lens, wherein the second bend is formed substantially perpendicular to the first bend.

9. The attachment point of claim 8, wherein the two apertures are each spaced the same distance from the edge of the lens so that the first bend is parallel to the edge of the lens.

10. The attachment point of claim 8, wherein the metal wire is Beta C titanium.

11. The attachment point of claim 8, wherein the lens includes a curved backside and a curved frontside, the first bend being adjacent to the curved backside of the lens and the second bend being adjacent to the curved frontside of the lens.

12. The attachment point of claim 8, wherein the two apertures are each spaced the same distance from the edge of the lens so that the first bend is parallel to the edge of the lens.

13. The eyeglass accessory, comprising:
a first lens having a first set of bridge holes formed adjacent an upper left inside edge of the first lens;
a second lens having a second set of bridge holes formed adjacent a right inside edge of the second lens;
a bridge wire having left and right terminal portions affixed within the first and second set of bridge holes,
wherein each terminal portion of the bridge wire includes:
a first bridge wire bend adjacent a respective terminal end of the bridge wire such that the respective terminal end of the bridge wire is inserted within a first of the respective set of bridge holes and the remainder received through a second of the respective set of bridge holes,
a second bridge wire bend in the remainder folded around the inside edge of the respective lens; and
a third bridge wire bend resulting in the lenses being substantially parallel to one another.

14. The accessory of claim 13, further including:
a first set of clip holes formed adjacent a lower right outside edge of the first lens;
a second set of clip holes formed adjacent a lower left outside edge of the second lens;
first and second clip wires affixed within the first and second set of clip holes, respectively, wherein each clip wire includes:
a first clip wire bend adjacent a respective terminal end of the clip wire such that the respective terminal end of the clip wire is inserted within a first of the respective set of clip holes and the remainder received through a second of the respective set of clip holes; and
a second clip wire bend in the remainder folded around the lower edge of the respective lens so that a terminal end of the remainder is configured to retain the lower edges of eyeglasses on which the accessory is installed.

15. The accessory of claim 13, wherein the first and second bridge bends for each wire are each approximately 180°.

16. The accessory of claim 13, wherein the first and second bridge bends for each wire are perpendicular to one another.

17. The accessory of claim 13, further including:
a first set of temple holes adjacent a left outside edge of the first lens;
a second lens having a second set of temple holes adjacent a right outside edge of the second lens;
a first temple wire affixed within the first set of temple holes;
a second temple wire affixed within the second set of temple holes, wherein each temple wire is affixed to its respective set of temple holes such that a terminal portion of the temple wire includes a first bend with the terminal portion inserted within a first of the set of temple holes and the remainder received through a second of the set of temple holes, and a second bend in the remainder folded around an edge of the respective lens so that the temple extends to a rear of the eyeglass accessory.

18. The accessory of claim 17, wherein the first and second wire bends are each 180°.

19. The attachment point of claim 13, wherein the metal wire is Beta C titanium.

* * * * *